US010789290B2

(12) United States Patent
Zhao

(10) Patent No.: US 10,789,290 B2
(45) Date of Patent: Sep. 29, 2020

(54) AUDIO DATA PROCESSING METHOD AND APPARATUS, AND COMPUTER STORAGE MEDIUM

(71) Applicant: Tencent Technology (Shenzhen) Company Limited, Shenzhen (CN)

(72) Inventor: Weifeng Zhao, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 183 days.

(21) Appl. No.: 16/102,485

(22) Filed: Aug. 13, 2018

(65) Prior Publication Data
US 2018/0349495 A1 Dec. 6, 2018

Related U.S. Application Data

(63) Continuation of application No. PCT/CN2017/083119, filed on May 4, 2017.

(30) Foreign Application Priority Data

May 4, 2016 (CN) .......................... 2016 1 0292614

(51) Int. Cl.
G10H 1/00 (2006.01)
G06F 16/68 (2019.01)
(Continued)

(52) U.S. Cl.
CPC .......... *G06F 16/686* (2019.01); *G06F 16/685* (2019.01); *G10H 1/0083* (2013.01);
(Continued)

(58) Field of Classification Search
CPC .......... G10H 2220/00; G10H 2220/011; G10H 2240/075
See application file for complete search history.

(56) References Cited

U.S. PATENT DOCUMENTS 6,740,802 B1 * 5/2004 Browne, Jr. ......... G10H 1/0025
 84/609
8,304,642 B1 * 11/2012 Bryan .................. G10H 1/0008
 84/477 R
(Continued)

FOREIGN PATENT DOCUMENTS

CN 101399036 A 4/2009
CN 101901598 A 12/2010
(Continued)

OTHER PUBLICATIONS

Tencent Technology, ISRWO, PCT/CN2017/083119, Jul. 21, 2017, 8 pgs.
(Continued)

Primary Examiner — Michael N Opsasnick
(74) Attorney, Agent, or Firm — Morgan, Lewis & Bockius LLP

(57) ABSTRACT

The present disclosure discloses an audio data processing performed by a computing device. The computing device obtains song information of a song, the song information comprising an accompaniment file, a lyric file, and a music score file that correspond to the song and then determines a predefined portion of the song and music score information corresponding to the predefined portion according to the song information. After receiving audio data that is input by a user, the computing device determines time information of each word in the audio data and then processes the audio data according to the time information of each word in the audio data and the music score information of the predefined portion of the song. Finally, the computing device obtains mixed audio data by mixing the processed audio data and the accompaniment file.

19 Claims, 4 Drawing Sheets

(51) Int. Cl.
*G06F 16/683* (2019.01)
*G10H 1/36* (2006.01)
*G10L 15/04* (2013.01)
*G10L 15/26* (2006.01)
*G10L 25/90* (2013.01)
*G10L 15/24* (2013.01)
*G10L 15/02* (2006.01)

(52) U.S. Cl.
CPC .............. *G10H 1/36* (2013.01); *G10H 1/365* (2013.01); *G10L 15/04* (2013.01); *G10L 15/26* (2013.01); *G10H 2210/061* (2013.01); *G10H 2220/011* (2013.01); *G10H 2230/015* (2013.01); *G10H 2240/141* (2013.01); *G10H 2240/325* (2013.01); *G10L 15/24* (2013.01); *G10L 25/90* (2013.01); *G10L 2015/025* (2013.01)

(56) References Cited

U.S. PATENT DOCUMENTS

| | | | | |
|---|---|---|---|---|
| 2002/0163533 A1* | 11/2002 | Trovato | ................. | G10H 1/368 715/728 |
| 2006/0009979 A1* | 1/2006 | McHale | ................. | A63F 13/10 704/270 |
| 2006/0112812 A1* | 6/2006 | Venkataraman | ....... | G10H 1/368 84/616 |
| 2007/0166683 A1* | 7/2007 | Chang | ...................... | G09B 5/06 434/307 R |
| 2009/0164034 A1 | 6/2009 | Cohen et al. | | |
| 2012/0116767 A1* | 5/2012 | Hasdell | ................. | G10H 1/361 704/254 |
| 2013/0144626 A1 | 6/2013 | Shau | | |
| 2017/0092247 A1* | 3/2017 | Silverstein | ............... | G10H 1/00 |
| 2017/0140745 A1* | 5/2017 | Nayak | .................. | H04L 65/605 |

FOREIGN PATENT DOCUMENTS

| | | |
|---|---|---|
| CN | 104252872 A | 12/2014 |
| CN | 105788589 A | 7/2016 |

OTHER PUBLICATIONS

Tencent Technology, IPRP, PCT/CN2017/083119, Nov. 6, 2018, 7 pgs.

\* cited by examiner

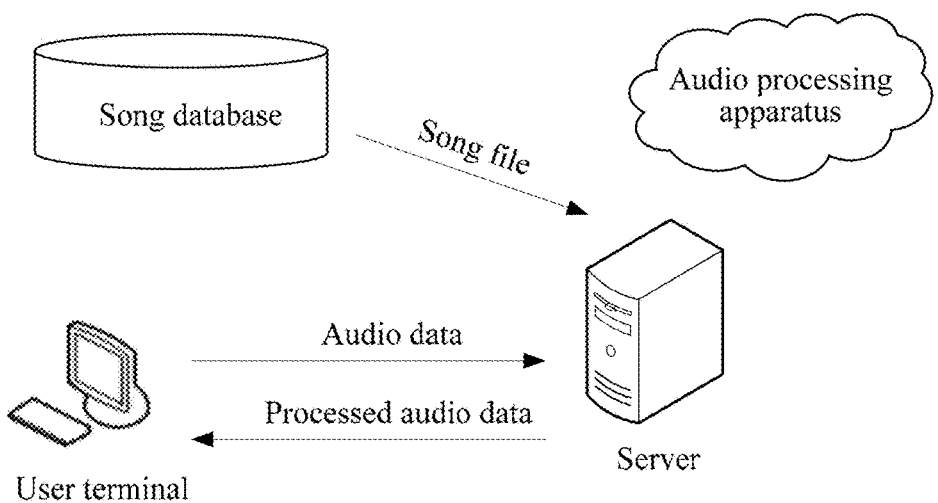
FIG. 1A
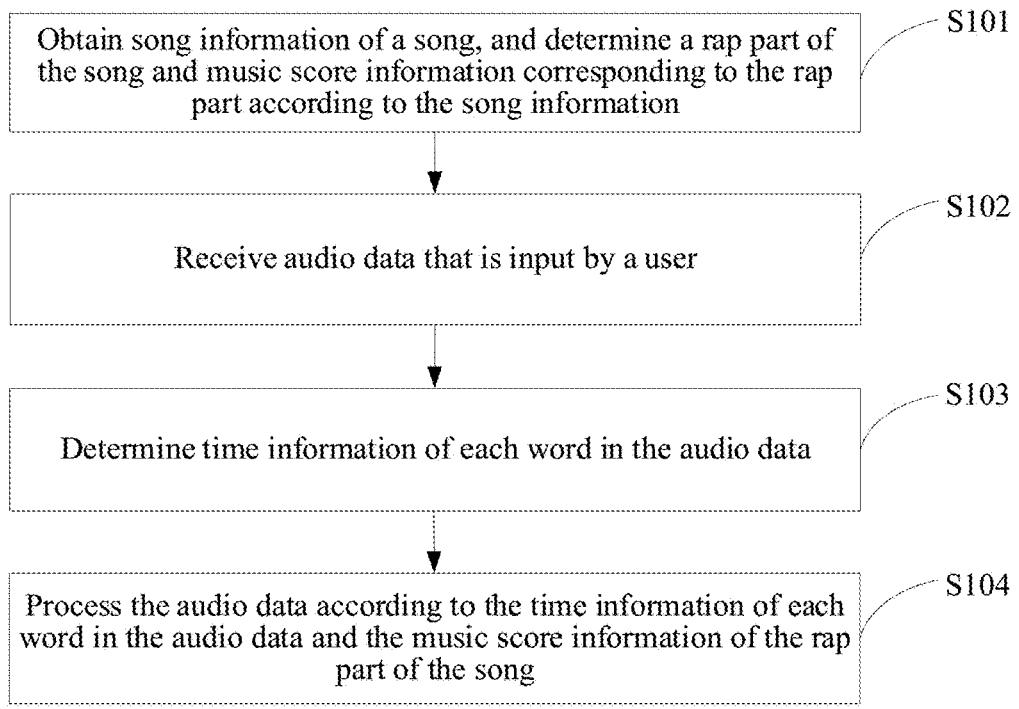
FIG. 1B
FIG. 1C

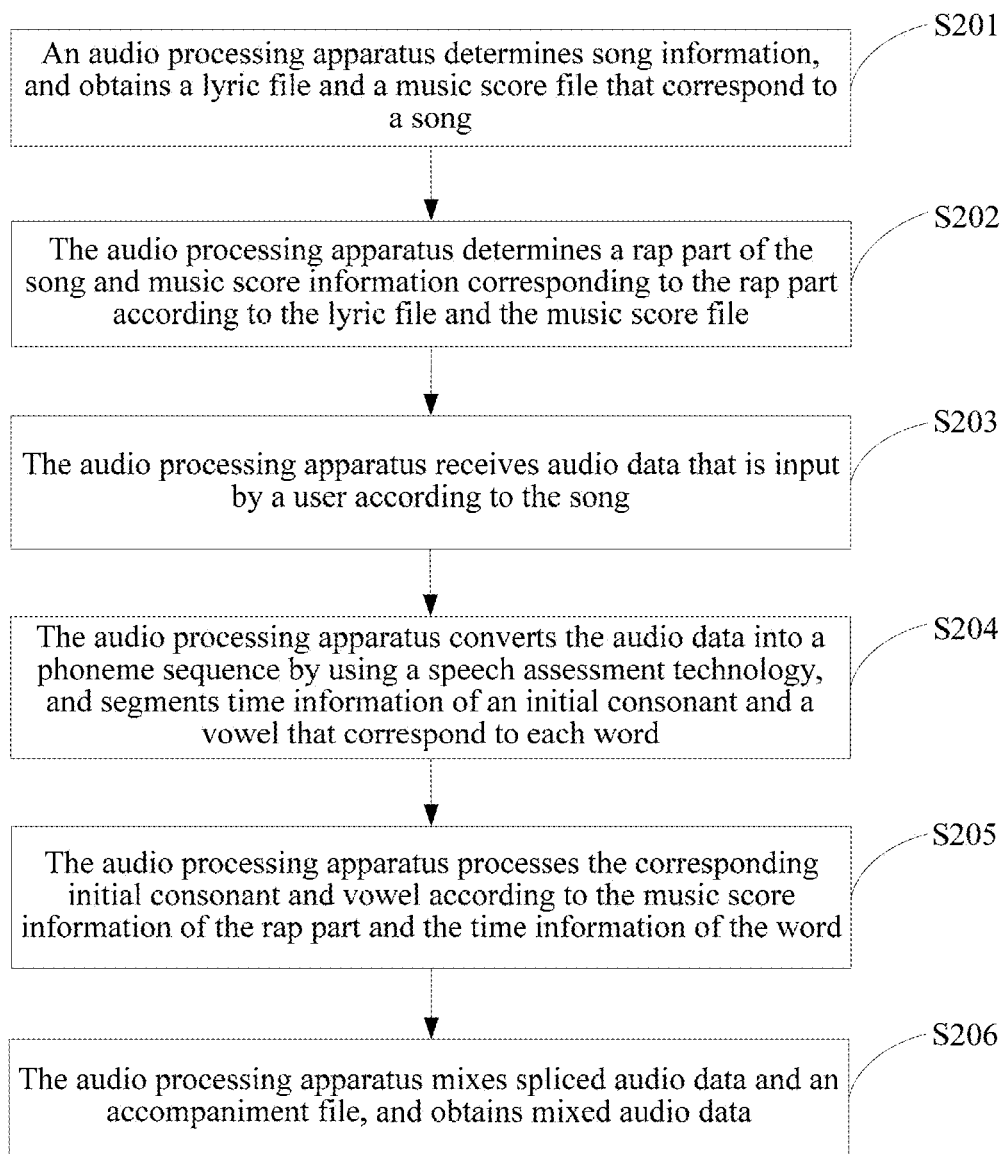

AUDIO DATA PROCESSING METHOD AND APPARATUS, AND COMPUTER STORAGE MEDIUM

PRIORITY CLAIM AND RELATED APPLICATION

This application is a continuation application of PCT/CN2017/083119, entitled "METHOD AND DEVICE FOR PROCESSING AUDIO DATA, AND COMPUTER STORAGE MEDIUM" filed on May 4, 2017, which claims priority to Chinese Patent Application No. 201610292614.0, filed with the State Intellectual Property Office of the People's Republic of China on May 4, 2016, and entitled "METHOD AND DEVICE FOR PROCESSING AUDIO DATA, AND COMPUTER STORAGE MEDIUM", all of which are incorporated herein by reference in their entirety.

FIELD OF THE TECHNOLOGY

This application relates to the field of communication technologies, and in particular, to an audio data processing method and apparatus, and a computer storage medium.

BACKGROUND OF THE DISCLOSURE

Currently, rap is a popular music form. Rap is characterized in speaking a series of sentences and words in rhyme quickly in a background of mechanical tempo. As a user purses personality, when listening others sing rap music, the user hopes to sing the rap music by himself.

In an existing karaoke product, a plurality of types of sound effects such as KTV, concert, or open-air square can be imitated, so that the user may freely sing the rap music.

During research and practice of the conventional technology, the inventor of the present disclosure finds that, because a singer usually needs to have music theory knowledge and singing technologies when singing rap music, it is difficult for ordinary users to sing the rap music. Consequently, user singing audio and original rap music audio are badly matched.

SUMMARY

An objective of the present disclosure is to provide an audio data processing method and apparatus, and a computer storage medium, to improve a matching effect between user singing audio and original rap music audio to improve rap performance quality.

To resolve the foregoing technical problems, this application provides the following technical solution:

According to a first aspect of the present disclosure, an audio data processing method is performed at a computing device having one or more processors and memory storing a plurality of programs to be executed by the one or more processors. The computing device obtains song information of a song. For example, the song information may include an accompaniment file, a lyric file, and a music score file that correspond to the song. According to the song information, the computing device determines a predefined portion of the song and music score information corresponding to the predefined portion. After receiving audio data input by a user, the computing device determines time information of each word in the audio data. Next, the computing device processes the audio data according to the time information of each word in the audio data and the music score information of the predefined portion of the song. The computing device mixes the processed audio data and the accompaniment file together.

According to a second aspect of the present disclosure, a computing device has one or more processors, memory coupled to the one or more processors, and a plurality of programs stored in the memory that, when executed by the one or more processors, cause the computing device to perform the aforementioned audio data processing method.

According to a third aspect of the present disclosure, a non-transitory computer readable storage medium stores a plurality of programs in connection with a computing device having one or more processors. The plurality of programs, when executed by the one or more processors, cause the computing device to perform the aforementioned audio data processing method.

Compared with the conventional technology, in this application, song information is obtained first, and a predefined portion of a song and corresponding music score information are determined according to the song information; then, audio data that corresponds to the predefined portion and that is input by a user is received, and time information of each word in the audio data is determined; and finally, word time lengths of corresponding words in the audio data are processed according to a preset rule and based on the time information and the music score information, and processed audio data is obtained. In this application, audio processing is performed on the word time lengths of the words by using the music score information of the predefined portion of the song and the time information that is of the words in the audio data that is input by the user, that is, user singing audio is matched with original rap music audio by using the audio processing performed on the words. Compared with a conventional manner in which a singer needs to have particular music theory knowledge and singing technologies when singing rap music, a more accurate matching between the user singing audio and the original rap music audio is achieved using the corresponding acoustic model and based on the calculation of confidence of characteristics of the corresponding audio frames and the overall rap performance quality is improved.

BRIEF DESCRIPTION OF THE DRAWINGS

The following describes specific implementations of the present disclosure in detail with reference to the accompanying drawings, to make the technical solutions and other beneficial effects of the present disclosure obvious.

FIG. 1A is a schematic diagram of a scenario of an audio data processing method according to this application;

FIG. 1B is a schematic flowchart of an audio data processing method according to a first embodiment of the present invention;

FIG. 1C is a schematic diagram of a lyric file in the audio data processing method according to the first embodiment of the present invention;

FIG. 1D is a schematic diagram of a music score file in the audio data processing method according to the first embodiment of the present invention;

FIG. 2 is a schematic flowchart of an audio data processing method according to a second embodiment of the present invention;

DESCRIPTION OF EMBODIMENTS

Figure 3A:
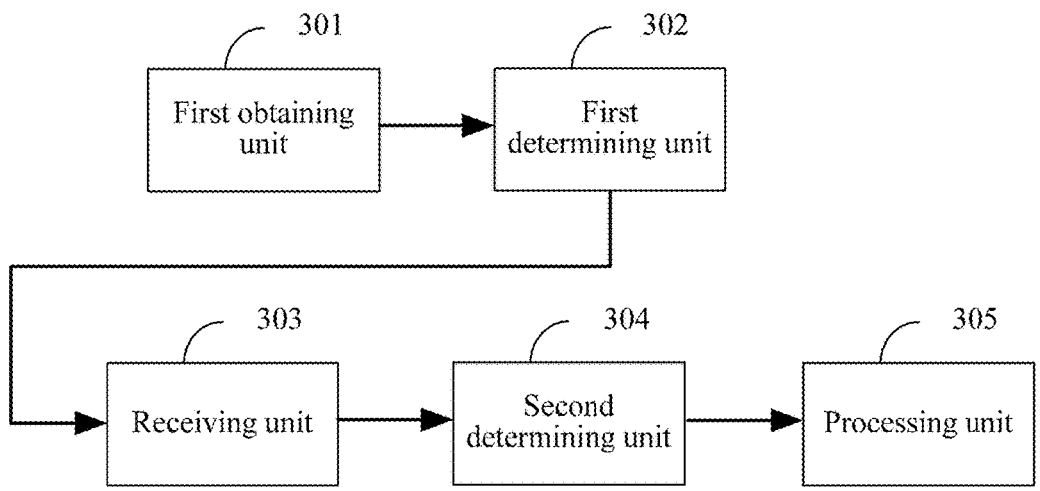
FIG. 3A is a schematic structural diagram of an audio data processing apparatus according to a third embodiment of the present invention.

Referring to the drawings, same components are represented by same component symbols. The principle of the present disclosure is illustrated by an application in a suitable computing environment. The following description is based on the illustrated specific embodiment of the present invention, which should not be construed as limiting other specific embodiments not discussed in detail herein.

In the following description, the specific embodiments of the present invention are described with reference to steps and symbols of operations performed by one or more computers, unless otherwise stated. As such, it will be understood that such steps and operations, which are at times referred to as being computer-executed, include the manipulation by the processing unit of the computer of electrical signals representing data in a structured form. This manipulation converts the data or maintains the location of the data in a memory system of the computer, which can be reconfigured, or otherwise a person skilled in this art changes the way of operation of the computer in a well-known manner. The data structure maintained in the physical location of the data in the memory has specific properties defined by the data format. However, the principle of the present disclosure described in the foregoing text does not lead to a limitation. A person skilled in the art may understand that the various steps and operations described below may also be implemented in hardware.

A term "module" used in the specification may be regarded as a software object executed in the calculation system. Different components, modules, engines, and services described in the specification may be regarded as objects implemented in the calculation system. The apparatus and method described in the specification is preferably implemented in a form of software, and definitely can be implemented in a form of hardware, both of which fall within the protection scope of the present disclosure.

This application provides an audio data processing method and apparatus, and a computer storage medium.

Referring to FIG. 1A, FIG. 1A is a schematic diagram of a scenario of an audio data processing method according to this application. The scenario may include an audio data processing apparatus, an audio processing apparatus for short that is mainly configured to: obtain song information of a song, and determine a predefined portion (e.g., rap part) of the song and music score information corresponding to the rap part according to the song information, the song information including an accompaniment file, a lyric file, and a music score file that correspond to the song; then, receive audio data that is input by a user, for example, audio data that is input by a user according to the rap part of the song; then, determine time information of each word in the audio data, and process word time lengths of corresponding words in the audio data according to a preset rule and based on the determined time information and the music score information of the rap part, and obtain processed audio data, and the like.

In addition, the scenario may further include a song database. The song database stores a large quantity of song information, and the song information includes an accompaniment file, a lyric file, and a music score file that correspond to a song. An audio processing apparatus may determine a predefined portion (e.g., rap part) of the song according to the lyric file and music score file in the song database. The rap part has corresponding music score information. Certainly, the scenario may further include a user terminal, such as a mobile phone or a tablet computer. The user terminal includes an input apparatus (such as a keyboard or a mouse) and an output apparatus (such as a screen or a power amplifier). A user triggers, by using the input apparatus, the audio processing apparatus to process audio data. After processing the audio data, the audio processing apparatus plays processed audio data for the user by using the input apparatus, and the like.

Detailed descriptions are provided below separately.

First Embodiment

In this embodiment, from the perspective of an audio processing apparatus, the audio processing apparatus may be specifically integrated into a network device such as a server or a gateway.

An audio data processing method, including: obtaining song information of a song, and determining a predefined portion (e.g., rap part) of the song and music score information corresponding to the rap part according to the song information, the song information including an accompaniment file, a lyric file, and a music score file that correspond to the song; receiving audio data that corresponds to the rap part and that is input by a user; determining time information of each word in the audio data; and processing the audio data according to the time information of each word in the audio data and the music score information of the rap part of the song.

Referring to FIG. 1B, FIG. 1B is a schematic flowchart of an audio data processing method according to the first embodiment of the present invention. The method includes:

Step S101: Obtain song information of a song, and determine a predefined portion (e.g., rap part) of the song and music score information corresponding to the rap part according to the song information.

The song may be any song in a song base. Specifically, the song may be any song in the song base that includes a predefined portion (e.g., rap part) that has distinct musical or audial features relative to the remaining portions of the song. Song information of each song in the song base includes an accompaniment file, a lyric file, and a music score file, and may further include an original song file and the like.

The accompaniment file refers to a performance file that accompanies singing of the song.

The lyric file refers to a file in which corresponding lyrics of the song and time information of the lyrics are recorded. In this application, the lyric file includes the corresponding lyrics of the song, and a start time and duration of each word in the lyrics. Referring to FIG. 1C, FIG. 1C shows an example of a lyric file provided in this application.

The music score file may be specifically a musical instrument digital interface (midi) file, a midi file for short. The music score file includes a musical note sequence included in the song, a start time and duration of each musical note in the musical note sequence, and a pitch of the musical note. Referring to FIG. 1D, FIG. 1D shows an example of a lyric file provided in this application.

Further, in this embodiment, the determining a predefined portion of a song according to the song information may specifically include:

1. obtaining a start time and a duration that correspond to each word included in the lyric file in the song information;

2. obtaining a start time and a duration that correspond to each musical note included in the music score file in the song information, and a pitch of the musical note; and 3. determining the predefined portion of the song according to the start time and the duration that correspond to each word included in the lyric file, the start time and the duration that correspond to each musical note included in the music score file, and the pitch of each musical note.

Specifically, because the lyric file includes the start time and the duration that correspond to each word, the music score file includes the start time and the duration that correspond to each musical note, and the pitch of each musical note, and because each word may correspond to one or more musical notes, when a word corresponds to one musical note, a start time, duration, and pitch information that correspond to each word may be obtained from the music score file; or when a word corresponds to multiple musical notes, a start time, duration, and pitch of the word may be correspondingly obtained according to a start time, duration, and pitch of the multiple musical notes. However, the rap part of the song is not content that is to be sung but to be spoken, and therefore there is no pitch information. Therefore, after comparison is performed on the lyric file and the music score file by alignment, pitch that corresponds to each word may be obtained. If some of the words do not have pitch, these words may be determined as the rap part of the song.

Step S102: Receive audio data that is input by a user.

For example, when the user selects a song, the user may be prompted to sing a rap part of the song, and the user may read according to a corresponding lyric file of the song. In some implementations, the user may alternatively change the lyrics autonomously. A lyric word count of the rap part in this embodiment needs to be consistent with a word count an original lyric file.

It may be understood that, the audio data that is input by the user in this embodiment may be speech data generated by rapping of the user. The audio data carries regular sound wave frequencies of speech, music, and sound effect and an amplitude change information carrier, and is an electrical signal that can be received by an audio device such as an acoustic device and then be played.

Step S103: Determine time information of each word in the audio data.

In this application, the time information of each word may be specifically time information of corresponding phonemes of each word that includes, for example, start time information and duration information of a corresponding initial consonant and vowel.

It may be understood that, in this application, the determining time information of each word in the audio data may specifically include the following steps:

A. converting the audio data into text data;

B. determining a lyric word count of the rap part and a word count of the text data; and C. when it is determined that the lyric word count is the same as the word count of the text data, segmenting one or more phonemes in the audio data corresponding to a word in the text data, and determining time information corresponding to the word.

The time information includes start time information and duration information.

For example, after the audio data that is input by the user is received, the audio data that is input by the user is first converted into a phoneme sequence by using a speech assessment technology, to segment time information of the initial consonant and vowel that correspond to each word.

Specifically, the audio data is converted into the phoneme sequence, and the phoneme sequence is replaced according to a preset acoustic model, to generate a model sequence; a characteristic of each frame in the audio data is determined, and a confidence of the characteristic of the frame in the model sequence is calculated, to obtain a confidence calculation result; and the time information of the initial consonant and vowel that correspond to the word is determined according to the confidence calculation result.

That is, an acoustic model needs to be established first. A large corpus may be collected first, and after the corpus is manually segmented into initial consonants and vowels, a model is trained for all the initial consonants and vowels. The model may adopt multiple forms such as GMM-HMM or DNN-HMM according to different scenarios, or may select different characteristics such as an mfcc (Mel-frequency cepstral coefficient) or an lpcc (linear prediction cepstral coefficient). Because specific pronunciation of each initial consonant and/or vowel is affected by context, phonemes of different context are separated when training a model. For example, for a same phoneme a, in different context, for example, n–a+m (representing that in the corpus an initial consonant n is before a vowel a, and an initial consonant m is after the vowel a) and k–a+m that have the same phoneme are trained to be two models actually. In this way, if a total quantity of initial consonants and/or vowels is n, a quantity of models that are actually trained is n^3.

Then, content that the user is to speak (that is, the audio data) is converted into a phoneme sequence. For example, "wo men" may be converted into a phoneme sequence of sil–w+o w–o+m m–en+sil (sil referring to silence). Then, the entire phoneme sequence may be replaced with the foregoing acoustic model, to obtain a model sequence.

When the user finishes reading, framing is performed on the audio data of the user, to obtain a characteristic of each frame, and a confidence of data of each frame is calculated in the model sequence. For example, one model may correspond to multiple frames, and a matching degree of 0 to 1 may be calculated between each frame of data and a model. Because the passed models are necessarily sequential, a path that maximizes a matching degree of all frames may finally be obtained, and the path is referred to as an optimal path. For example, when there are five frames of data and two models, there may be five different paths in total, respectively (5, 0) (representing that there are five frames corresponding to a model 1 and zero fame corresponding to a model 2, and that a total confidence in this case is a product of a matching degree between each of the five frames of data and the model 1), (4, 1), . . . ). Finally, we may learn, according to the optimal path, an initial consonant or a vowel that the user reads in a particular time and a confidence of pronunciation of the user.

It may be understood that, in this embodiment, the foregoing speech assessment technology is described merely by using the phonetic segment of a word as an example, and should not be construed as limitation on the present disclosure.

Preferably, after the audio data is converted into the text data, it is determined whether a word count that is input by the user (that is, a count of text data) is consistent with a lyric word count (lyrics of the rap part), and if no, the user is prompted to re-input the word count; or if yes, the time information of each word in the audio data is segmented by using the foregoing speech assessment solution, to obtain start time information and duration information of a corresponding initial consonant or vowel.

Step S104: Process word time lengths of corresponding words in the audio data according to a preset rule and based on the time information and the music score information, and obtain processed audio data.

It may be understood that, after the time information of each word in the audio data is determined, word time lengths of corresponding words in the audio data may be processed according to a preset rule and according to the time information and the music score information of the rap part. For example, the audio data that is input by the user is stretched or compressed, and obtain processed audio data.

For example, in a possible implementation, the processing word time lengths of corresponding words in the audio data according to a preset rule and based on the time information and the music score information of the rap part, and obtaining processed audio data may specifically include:

a. extracting an audio segment corresponding to each word from the audio data based on the time information;

b. determining a corresponding word time length according to the audio segment;

c. performing audio processing on word time lengths of corresponding words according to a preset rule and based on the word time lengths and a corresponding audio time length in the music score information, and obtaining words obtained after audio processing; and d. splicing the words on which the audio processing is performed, and obtaining processed audio data.

The performing audio processing on word time lengths of corresponding words according to a preset rule may include: if a corresponding audio time length in the music score information is greater than a word time length, stretching the word time length; if a corresponding audio time length in the music score information is equal to a word time length, keeping the word time length unchanged; or if a corresponding audio time length in the music score information is less than a word time length, compressing the word time length.

That is, the music score information of the rap part and the audio data are aligned according to time, so that the word time length may be stretched, compressed, or the like according to the word time length and the audio time length in the music score information. Finally, words obtained after the audio processing are spliced, so that processed audio data may be obtained.

It may be understood that, the audio processing can be performed on the words in many manners, for example:

c1. controlling an initial consonant time length to be kept unchanged and stretching a vowel time length if a corresponding audio time length in the music score information is larger than a word time length;

c2. controlling an initial consonant time length and a vowel time length to be kept unchanged if a corresponding audio time length in the music score information is equal to a word time length; or c3. compressing both an initial consonant time length and a vowel time length if a corresponding audio time length in the music score information is less than a word time length.

That is, the initial consonant time length and the vowel time length that correspond to each word may be determined according to the result of the phonetic segment of the word indicated in the text data.

Preferably, after the words on which audio processing is performed are spliced, and the processed audio data is obtained (step d), if there is a time difference between words of the lyrics, zero-filling processing may further be performed.

In this embodiment, the zero-filling processing includes two parts. One part is that there is an interval between words of real lyrics. For example, when a singer takes a breath or changes a sentence when singing, zero-filling needs to be performed, so that synthesized audio and original accompaniment are aligned. The other part is that because a time length obtained after stretching or compressing may not be accurate enough, zero-filling needs to be performed for alignment, to make the synthesized audio aligned with the accompaniment.

Further, after the processed audio data is obtained, the method may further include:

e. obtaining an accompaniment file of the song; and f. obtaining mixed audio data by mixing the processed audio data and the accompaniment file.

For example, a corresponding accompaniment file of a song is obtained from a preset song base, and audio data on which processing such as word time length stretching or compressing processing or splicing is performed is mixed with the accompaniment file, to obtain final audio (that is, mixed audio data).

After the mixed audio data is obtained, the mixed audio data may further be displayed for the user for, for example, an audition of the user. If the user is satisfied, the mixed audio data may be merged into overall performance of the song of the user.

It can be learned from above that according to the audio data processing method provided in this embodiment, song information is obtained first, and a rap part of a song and corresponding music score information are determined; then, audio data that corresponds to the rap part and that is input by a user is received, and time information of each word in the audio data is determined; and finally, word time lengths of corresponding words in the audio data are processed according to a preset rule and based on the time information and the music score information, and processed audio data is obtained. In this application, audio processing is performed on the word time lengths of the words by using the music score information of the rap part of the song and the time information that is of the words in the audio data that is input by the user, that is, user singing audio is matched with original rap music audio by using the audio processing performed on the word time lengths. Compared with a current manner in which a singer needs to have particular music theory knowledge and singing technologies when singing rap music, rap performance quality is improved, and a matching effect between the user singing audio and the original rap music audio is greatly improved.

Second Embodiment

According to the method described in the first embodiment, the following further provides detailed descriptions by using an example.

First, an audio processing apparatus obtains time information of a word in the audio data by converting audio data that is input by a user into the text data. Then, the audio processing apparatus stretches or compresses word time lengths with reference to music score information of a rap part of a song, that is, matches user singing audio and original rap music audio by changing duration of the word. The following gives detailed descriptions.

Referring to FIG. 2, FIG. 2 is a schematic flowchart of an audio data processing method according to the second embodiment of the present invention. The method includes:

Step S201: An audio processing apparatus determines song information, and obtains a lyric file and a music score file that correspond to a song.

Step S202: The audio processing apparatus determines a rap part of the song and music score information corresponding to the rap part according to the lyric file and the music score file.

Step S203: The audio processing apparatus receives audio data that is input by a user according to the song.

Step S201 to step S203 may be specifically:

It may be understood that, a large number of songs are stored in a preset song base. Specifically, the song may be any song that includes a rap part. Song information of each song includes an accompaniment file, a lyric file, and a music score file, and may further include an original song file and the like. A user may select, according to the files, a song that he/she wants to sing.

For example, in a corresponding song base of a karaoke application, a song A is determined, and a corresponding lyric file and a music score file are obtained. A format of the lyric file may specifically refer to FIG. 1C, and the lyric file includes corresponding lyrics of the song and a start time and duration of each word in the lyrics. A format of the music score file may specifically refer to FIG. 1D, and the music score file includes a musical note sequence included in the song, a start time and duration of each musical note in the musical note sequence, and a pitch of the musical note.

For example, FIG. 1C and FIG. 1D are the lyric file and the music score file of the song A, a part that is sung by an "MC" (a rapper, Microphone Controller) is a rap part rap, and a part that is sung by "Yue" is ordinary singing. First, a rap sentence needs to be marked in the song base. Because a feature of the rap sentence is not singing but speaking, there is no pitch information. Therefore, when time alignment is performed on the lyric file and the music score file, lyrics without a pitch information part are marked as rap. After the user selects the song A, the rap part of the song A may be prompted to the user, and the user may read according to the lyrics of the song A.

It can be easily figured out that, in some implementations, the user may automatically change the lyrics, but a lyric word count of the rap part needs to be consistent with a word count of an original lyric file.

Step S204: The audio processing apparatus converts the audio data into a phoneme sequence by using a speech assessment technology, and segments time information of an initial consonant and a vowel that correspond to each word.

It may be understood that, after the user inputs the audio, because tempo needs to be changed, accurate time information of each word sung by the singer needs to be clearly known, and specific steps may be as follows:

(1) converting the audio data into text data by using an existing speech recognition service in the industry;

(2) determining a lyric word count of the rap part and a word count of the text data; and (3) when it is determined that the lyric word count is the same as the word count of the text data, segmenting one or more phonemes in the audio data corresponding to a word in the text data, and determining time information corresponding to the word.

For example, after the audio data is converted into the text data, it needs to be determined whether a word count that is input by the user (that is, a count of text data) is consistent with a lyric word count (lyrics of the rap part), and if no, the user is prompted to re-input the word count; or if yes, the time information of each word in the audio data is segmented by using the speech assessment solution, to obtain start time information and duration information of a corresponding initial consonant or vowel.

Step S205: The audio processing apparatus processes the corresponding initial consonant and vowel according to the music score information of the rap part and the time information of the word.

For example, in this embodiment, that the audio processing apparatus processes the corresponding initial consonant and vowel according to the music score information of the rap part and the time information of the word may specifically include the following steps:

(1) extracting, according to start time information and duration information that correspond to a word, corresponding audio of each word from user audio (that is, the audio data);

(2) determining a corresponding word time length according to the corresponding audio of the word; and (3) performing audio processing on word time lengths of corresponding words according to a preset rule and based on the word time lengths and a corresponding audio time length in the music score information, and obtaining words obtained after the audio processing.

That is, the music score information of the rap part and the audio data are aligned according to time, so that audio processing such as stretching or compressing an initial consonant and/or a vowel may be performed according to a word time length and a corresponding audio time length in the music score information. The audio processing may be performed on the word time length of the word in the following specific manner:

First, for each word in lyrics, corresponding duration of an initial consonant and vowel time length are determined according to a corresponding word time length. For example, recording duration of a word is n, recording duration of an initial consonant of the word is n1, recording vowel time length is n2, and corresponding lyric duration (that is, the corresponding audio time length in the music score information) is m. If m>n, the user record needs to be stretched, initial consonant time length is kept unchanged, and only the vowel time length is stretched; or if m=n, the initial consonant time length and the vowel time length are kept unchanged; or if m<n, the user recording needs to be compressed, and in this case both the initial consonant time length and the vowel time length may be compressed.

Preferably, because the initial consonant part is mostly unvoiced consonants, a fundamental frequency (a frequency of a fundamental tone is a fundamental frequency and decides pitch of the entire tone) cannot be extracted. Therefore, a manner of stretching or compressing the initial consonant time length or the vowel time length may be as follows:

1) using 30 ms as a frame length, 5 ms as a frame relay, and extracting a fundamental tone sequence of original audio, where the fundamental tone sequence refers to voice that is compounded by a series of vibrations that have different frequencies and amplitudes and that are generated by an acoustic source;

2) stretching and compressing the original audio, where the stretching is performed by means of interpolation, and the compressing is performed by means of extraction, as the compressing and stretching are performed, the fundamental frequency of an original fundamental tone sequence is changed, and the fundamental tone sequence extracted in step 1) is stretched and compressed synchronously when the original audio is processed; and 3) using a linear predictive coding (LPC) synthesis filter method to perform fundamental tone recovery on stretched and compressed audio.

It should be noted that, in this application, that the original audio is stretched by means of interpolation, the original audio is compressed by means of extraction, fundamental tone recovery is performed on the audio by using an LPC synthesis filter method, and the like may all be implemented by using an existing method, and details are not described herein again.

(4) splicing the words obtained after the audio processing.

After all words are processed according to steps (1) to (3), the stretched or compressed audio is spliced, and processed audio data is obtained. If there is a time difference between words of the lyrics, zero-filling may further be performed.

In this embodiment, the zero-filling processing includes two parts. One part is that there is an interval between words of real lyrics. For example, when a singer takes a breath or changes a sentence when singing, zero-filling needs to be performed, so that synthesized audio and original accompaniment are aligned. The other part is that because a time length obtained after stretching or compressing may not be accurate enough, zero-filling needs to be performed for alignment, to make the synthesized audio aligned with the accompaniment.

Step S206: The audio processing apparatus mixes spliced audio data and an accompaniment file, and obtains mixed audio data.

For example, it is assumed that both the accompaniment audio and the user audio (that is, the spliced audio data) are in a format of 44 k and 16 bit. First, average energy of the accompaniment audio is calculated, an absolute value of a value of each sampling point of the accompaniment audio is taken, to obtain n values (0~32768), so that an average value x of the n values is calculated. Then, an average value x of y of the user audio is obtained by using the same method. Finally, each sampling point is processed. For example, if an accompaniment value of an $i^{th}$ sampling point is xi, and a value of the user audio is yi, final energy obtained after mixing and combination is $xi*(0.4*y/x)+yi*(1-0.4*y/x)$.

Further, after the mixed audio data is obtained, the mixed audio data may further be displayed for the user for, for example, an audition of the user. If the user is satisfied, the mixed audio data may be merged into overall performance of the song of the user. Therefore, by using the method of the present disclosure, ordinary reading speech that is read by a user at any tempo is converted into rap performance that is consistent with standard tempo, so that a good rap performance effect can be obtained when the user read arbitrarily.

It can be learned from above that according to the audio data processing method provided in this embodiment, song information is obtained first, and a rap part of a song and corresponding music score information are determined; then, audio data that corresponds to the rap part and that is input by a user is received, and time information of each word in the audio data is determined; and finally, word time lengths of corresponding words in the audio data are processed according to a preset rule and based on the time information and the music score information, and processed audio data is obtained. In this application, audio processing is performed on the word time lengths of the words by using the music score information of the rap part of the song and the time information that is of the words in the audio data that is input by the user, that is, user singing audio is matched with original rap music audio by using the audio processing performed on the words. Compared with a current manner in which a singer needs to have particular music theory knowledge and singing technologies when singing rap music, rap performance quality is improved, and a matching effect between the user singing audio and the original rap music audio is greatly improved.

Third Embodiment

To better implement the audio data processing method provided in this application, an apparatus based on the foregoing audio data processing method is further provided. Nouns have meanings the same as those in the foregoing audio data processing method, and for implementation details, refer to the description of the method embodiments.

Referring to FIG. 3A, FIG. 3A is a schematic structural diagram of an audio data processing apparatus according to this application. The audio data processing apparatus may include a first obtaining unit 301, a first determining unit 302, a receiving unit 303, a second determining unit 304, and a processing unit 305.

The first obtaining unit 301 is configured to obtain song information. The song information includes an accompaniment file, a lyric file, and a music score file that correspond to the song. The first determining unit 302 is configured to determine a rap part of the song and corresponding music score information of the rap part according to the song information.

The song may be any song in a song base. Specifically, the song may be any song in the song base that includes a rap part. Song information of each song in the song base includes an accompaniment file, a lyric file, and a music score file, and may further include an original song file and the like.

The accompaniment file refers to a performance file that accompanies singing of the song. The lyric file refers to a file in which corresponding lyrics of the song and time information of the lyrics are recorded. In this application, the lyric file includes the corresponding lyrics of the song, and a start time and duration of each word in the lyrics. A music score file may be specifically a musical instrument digital interface file, a midi file for short. The music score file includes a musical note sequence included in the song, a start time and duration of each musical note in the musical note sequence, and a pitch of the musical note.

The receiving unit 303 is configured to receive audio data that is input by a user. The second determining unit 304 is configured to determine time information of each word in the audio data. The processing unit 305 is configured to process word time lengths of corresponding words in the audio data according to a preset rule and based on the time information and the music score information, and obtain processed audio data.

Figure 3B:
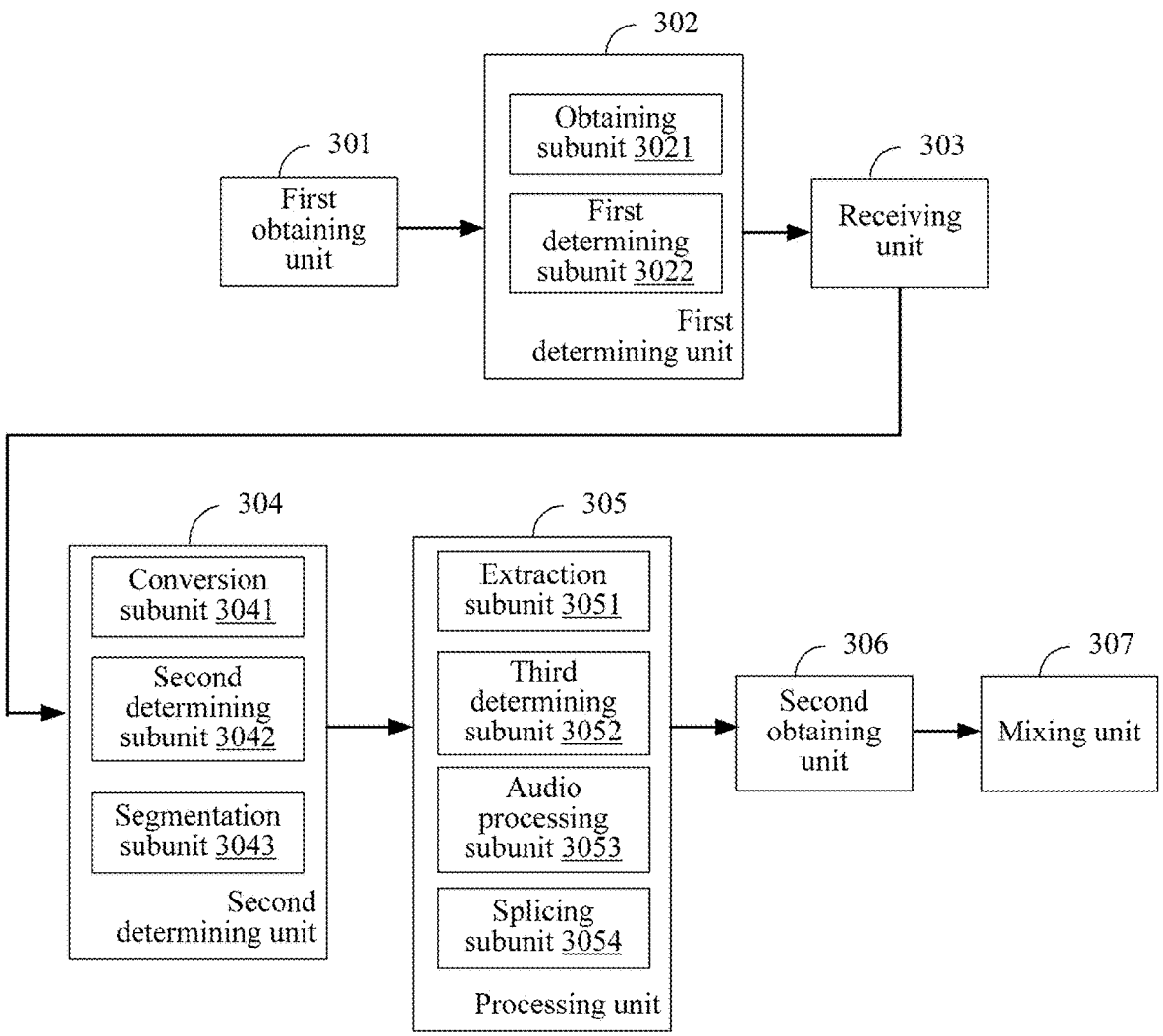
FIG. 3B is another schematic structural diagram of the audio data processing apparatus according to the third embodiment of the present invention.

Referring to FIG. 3B together, FIG. 3B is another schematic structural diagram of the audio data processing apparatus according to this application. In this application, the first determining unit 302 may include:

an obtaining subunit 3021, configured to: obtain a start time and a duration that correspond to each word included in the lyric file in the song information, and obtain a start time and a duration that correspond to each musical note included in the music score file in the song information and a pitch of the musical note; and a first determining subunit 3022, configured to determine the rap part of the song according to the start time and the duration that correspond to each word included in the lyric file, the start time and the duration that correspond to each musical note included in the music score file, and the pitch of each musical note.

Specifically, because the lyric file includes the start time and the duration that correspond to each word, and the music score file includes the start time and the duration that correspond to each musical note, and the pitch of each musical note, and because each word may correspond to one or more musical notes, when a word corresponds to one musical note, a start time, duration, and pitch information that correspond to each word may be obtained from the music score file; or when a word corresponds to multiple musical notes, a start time, duration, and pitch of the word may be correspondingly obtained according to a start time, duration, and pitch of the multiple musical notes. However, the rap part of the song is not content that is to be sung but to be spoken, and therefore there is no pitch information. Therefore, after comparison is made between the lyric file and the music score file by alignment, pitch that corresponds to each word may be obtained. If some of the words do not have pitch, these words may be determined as the rap part of the song.

Then, the receiving unit 303 receives the audio data input by the user.

For example, when the user selects a song, the user may be prompted to sing a rap part of the song, and the user may read according to a corresponding lyric file of the song. In some implementations, the user may alternatively change the lyrics autonomously. A lyric word count of the rap part in this embodiment needs to be consistent with a word count an original lyric file.

It may be understood that, the audio data that is input by the user in this embodiment may be speech data generated by rapping of the user. The audio data carries regular sound wave frequencies of speech, music, and sound effect and an amplitude change information carrier, and is an electrical signal that can be received by an audio device such as an acoustic device and then be played.

It may be understood that, in this application, the second determining unit 304 may include:

a conversion subunit 3041, configured to convert the audio data into text data;

a second determining subunit 3042, configured to determine a lyric word count of the rap part and a word count of the text data; and a segmentation subunit 3043, configured to: when it is determined that the lyric word count is the same as the word count of the text data, segment one or more phonemes of a word indicated by the text data, and determine time information that corresponds to the word, where the time information includes start time information and duration information.

For example, after the audio data that is input by the user is received, the audio data that is input by the user is first converted into a phoneme sequence by using a speech assessment technology, to segment time information of the initial consonant and vowel that correspond to each word.

When determining the time information corresponding to the word, the segmentation subunit 3043 may be specifically configured to: convert the audio data into a phoneme list, and replace the phoneme list according to a preset acoustic model, to generate a model sequence; determine a characteristic of each frame in the audio data, and calculate a confidence of the characteristic of the frame in the model sequence, to obtain a confidence calculation result; and determine, according to the calculation result, the time information of the initial consonant and vowel that correspond to the word.

Preferably, after the audio data is converted into the text data, it is determined whether a word count that is input by the user (that is, a count of text data) is consistent with a lyric word count (lyrics of the rap part), and if no, the user is prompted to re-input the word count; or if yes, the time information of each word in the audio data is segmented by using the foregoing speech assessment solution, to obtain start time information and duration information of a corresponding initial consonant or vowel.

It may be understood that, after the time information of each word in the audio data is determined, word time lengths of corresponding words in the audio data may be processed according to a preset rule and according to the time information and the music score information of the rap part. For example, the audio data that is input by the user is stretched or compressed, and obtain processed audio data.

For example, in a possible implementation, the processing unit 305 may include:

an extraction subunit 3051, configured to extract, from the audio data and based on the time information, corresponding audio data of each word, to obtain an audio segment;

a third determining subunit 3052, configured to determine a corresponding word time length according to the audio segment;

an audio processing subunit 3053, configured to perform audio processing on word time lengths of corresponding words according to a preset rule and based on the word time lengths and a corresponding audio time length in the music score information, and obtain words obtained after audio processing; and a splicing subunit 3054, configured to splicing the words on which the audio processing is performed, and obtain processed audio data.

The audio processing subunit 3053 may be configured to: if a corresponding audio time length in the music score information is greater than a word time length, stretch the word time length; or if a corresponding audio time length in the music score information is equal to a word time length, keep the word time length unchanged; or if a corresponding audio time length in the music score information is less than the word time length, compress the word time length.

That is, the music score information of the rap part and the audio data are aligned according to time, so that the word time length may be stretched, compressed, or the like according to the word time length and the audio time length in the music score information. Finally, words obtained after the audio processing are spliced, so that processed audio data may be obtained.

It may be understood that, the audio processing can be performed on the words in many manners. For example, the audio processing subunit 3053 may be specifically configured to:

if a corresponding audio time length in the music score information is larger than a word time length, control initial consonant time length to be unchanged, and stretch the vowel; if a corresponding audio time length in the music score information is equal to a word time length, control initial consonant time length and vowel time length to be unchanged; or if a corresponding audio time length in the music score information is less than a word time length, compress both an initial consonant time length and a vowel time length.

That is, the initial consonant time length and the vowel time length that correspond to each word may be determined according to the result of the phonetic segment of the word indicated in the text data.

Preferably, after the words on which the audio processing is performed are spliced, and the processed audio data is obtained, if there is a time difference between words of the lyrics, zero-filling processing may further be performed.

In this embodiment, the zero-filling processing includes two parts. One part is that there is an interval between words of real lyrics. For example, when a singer takes a breath or changes a sentence when singing, zero-filling needs to be performed, so that synthesized audio and original accompaniment are aligned. The other part is that because a time length obtained after stretching or compressing may not be accurate enough, zero-filling needs to be performed for alignment, to make the synthesized audio aligned with the accompaniment.

Further, the audio data processing apparatus may further include:

a second obtaining unit 306, configured to obtain the accompaniment file of the song; and a mixing unit 307, configured to mix the processed audio data and the accompaniment file, and obtain mixed audio data.

For example, a corresponding accompaniment file of a song is obtained from a preset song base, and audio data on which processing such as word time length stretching or compressing processing or splicing is performed is mixed with the accompaniment file, to obtain final audio (that is, mixed audio data).

After the mixed audio data is obtained, the mixed audio data may further be displayed for the user for, for example, an audition of the user. If the user is satisfied, the mixed audio data may be merged into overall performance of the song of the user.

During specific implementation, the foregoing units may be implemented as independent entities, or may be combined arbitrarily, or may be implemented as a same entity or several entities. For specific implementation of the foregoing units, refer to the foregoing method embodiments. Details are not described herein again.

The audio data processing apparatus may be specifically integrated into a network device such as a server or a gateway.

It can be learned from above that according to the audio data processing apparatus provided in this embodiment, song information is obtained first, and a rap part of a song and corresponding music score information are determined; then, audio data that corresponds to the rap part and that is input by a user is received, and time information of each word in the audio data is determined; and finally, word time lengths of corresponding words in the audio data are processed according to a preset rule and based on the time information and the music score information, and processed audio data is obtained. In this application, audio processing is performed on the word time lengths of the words by using the music score information of the rap part of the song and the time information that is of the words in the audio data that is input by the user, that is, user singing audio is matched with original rap music audio by using the audio processing performed on the words. Compared with a current manner in which a singer needs to have particular music theory knowledge and singing technologies when singing rap music, rap performance quality is improved, and a matching effect between the user singing audio and the original rap music audio is greatly improved.

In the foregoing embodiments, the descriptions of the embodiments have respective focuses, for the part that is not described in detail in an embodiment, refer to the foregoing detailed description of the audio data processing method, and details are not described herein again.

The audio data processing apparatus provided in this application is, for example, a computer, a tablet computer, or a mobile phone having a touch function. The audio data processing apparatus and the method for estimating user influence on a social platform in the foregoing embodiments belong to a same concept. Any method provided in the embodiments of the method for estimating user influence on a social platform may run on the audio data processing apparatus. For details of a specific implementation, refer to the embodiments of the method for estimating user influence on a social platform. Details are not described herein again.

Figure 4:
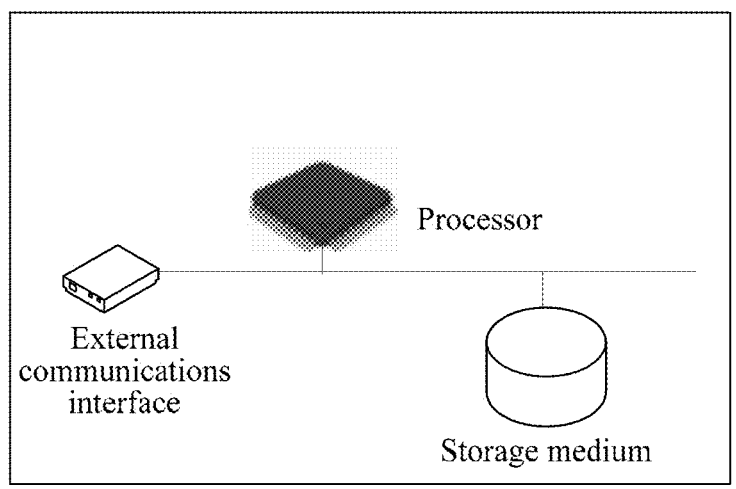
FIG. 4 is a schematic structural composition diagram of hardware according to this application.

This embodiment provides specific hardware based on the foregoing embodiment. As shown in FIG. 4, the apparatus includes a processor, a computer storage medium, and at least one external communications interface. The processor, the computer storage medium, and the external communications interface are connected by using a bus. The processor may be an electronic component having a processing function, for example, a microprocessor, a central processing unit, a digital signal processor, or a programmable logic array. The computer storage medium stores computer executable code.

The processor, when executing the computer executable code, at least implements the following functions: obtaining song information, and determining a rap part of a song and music score information corresponding to the rap part according to the song information, the song information including an accompaniment file, a lyric file, and a music score file that correspond to the song;

receiving audio data that is input by a user;

determining time information of each word in the audio data; and processing the audio data according to the time information of each word in the audio data and the music score information of the rap part of the song.

It should be noted that, for the audio data processing method of the present disclosure, a person of ordinary skill in the art may understand that all or some procedures of the audio data processing method may be implemented by using a computer program by controlling related hardware. The computer program may be stored in a non-transitory computer readable storage medium, for example, stored in a memory of a terminal, and be executed by at least one processor in the terminal. When the computer program is running, the procedures of the audio data processing method in the embodiments are performed. The foregoing storage medium may include: a magnetic disk, an optical disc, a read-only memory (ROM), or a random access memory (RAM).

The audio data processing apparatus in this application may be integrated into one processing chip, or each of the modules may exist alone physically, or two or more modules are integrated into one module. The integrated module may be implemented in a form of hardware, or may be implemented in a form of a software functional module. When the integrated module is implemented in the form of a software functional module and sold or used as an independent product, the integrated unit may be stored in a non-transitory computer readable storage medium. The storage medium is, for example, an ROM, a magnetic disk, or an optical disc.

An audio data processing method and apparatus, and a computer storage medium provided in this application are described in detail above. The principle and implementation of the present disclosure are described herein through specific examples. The description about the embodiments of the present invention is merely provided for ease of understanding of the method and core ideas of the present disclosure. Meanwhile, a person skilled in the art may make variations to the present disclosure in terms of the specific implementations and application scopes according to the ideas of the present disclosure. Therefore, the content of the specification shall not be construed as a limit to the present disclosure.

What is claimed is:

1. An audio data processing method performed at a computing device having one or more processors and memory storing a plurality of programs to be executed by the one or more processors, the method comprising:
   obtaining song information of a song, the song information comprising an accompaniment file, a lyric file, and a music score file that correspond to the song;
   determining a predefined portion of the song and music score information corresponding to the predefined portion according to the song information;
   receiving audio data that is input by a user;
   determining time information of each word in the audio data;
   extracting an audio segment corresponding to the word from the audio data based on the time information;
   performing audio processing to the word based on its corresponding word time length according to the audio segment and a corresponding audio time length in the music score information; and
   obtaining the processed audio data by splicing the words obtained after the audio processing.

2. The audio data processing method according to claim 1, wherein the determining a predefined portion of the song according to the song information comprises:
   obtaining a start time and a duration that correspond to each word comprised in the lyric file in the song information;
   obtaining a start time and a duration that correspond to each musical note comprised in the music score file in the song information, and a pitch of the musical note; and
   determining the predefined portion of the song according to the start time and the duration that correspond to each word comprised in the lyric file, the start time and the duration that correspond to each musical note comprised in the music score file, and the pitch of the musical note.

3. The audio data processing method according to claim 1, wherein the determining time information of each word in the audio data comprises:
   converting the audio data into text data;
   determining a lyric word count of the predefined portion and a word count of the text data; and
   when it is determined that the lyric word count is the same as the word count of the text data, segmenting one or more phonemes in the audio data corresponding to a word in the text data, and determining time information corresponding to the word, the time information comprising start time information and duration information.

4. The audio data processing method according to claim 1, wherein the determining time information corresponding to the word comprises:
   converting the audio data into a phoneme sequence, and replacing the phoneme sequence according to a preset acoustic model, to generate a model sequence;
   determining a characteristic of each frame in the audio data, and calculating a confidence of the characteristic of the frame in the model sequence, to obtain a confidence calculation result; and
   determining time information of an initial consonant and a vowel that correspond to a word according to the confidence calculation result.

5. The audio data processing method according to claim 1, wherein the performing audio processing to the word based on its corresponding word time length according to the audio segment and a corresponding audio time length in the music score information comprises:
   stretching the word time length if the corresponding audio time length in the music score information is greater than the word time length;
   keeping the word time length unchanged if the corresponding audio time length in the music score information is equal to the word time length; and
   compressing the word time length if the corresponding audio time length in the music score information is less than the word time length.

6. The audio data processing method according to claim 5, wherein
   the stretching the word time length if the corresponding audio time length in the music score information is greater than the word time length comprises: controlling an initial consonant time length to be kept unchanged and stretching a vowel time length if the corresponding audio time length in the music score information is greater than the word time length;
   the keeping the word time length unchanged if the corresponding audio time length in the music score information is equal to the word time length comprises: controlling an initial consonant time length and a vowel time length to be kept unchanged if the corresponding audio time length in the music score information is equal to the word time length; and
   the compressing the word time length if the corresponding audio time length in the music score information is less than the word time length comprises: compressing both an initial consonant time length and a vowel time length if the corresponding audio time length in the music score information is less than the word time length.

7. The audio data processing method according to claim 1, further comprising:
   obtaining mixed audio data by mixing the processed audio data and the accompaniment file.

8. A computing device having one or more processors, memory coupled to the one or more processors, and a plurality of programs stored in the memory that, when executed by the one or more processors, cause the computing device to perform the following operations:
   obtaining song information of a song, the song information comprising an accompaniment file, a lyric file, and a music score file that correspond to the song;
   determining a predefined portion of the song and music score information corresponding to the predefined portion according to the song information;
   receiving audio data that is input by a user;
   determining time information of each word in the audio data;
   extracting an audio segment corresponding to the word from the audio data based on the time information;
   performing audio processing to the word based on its corresponding word time length according to the audio segment and a corresponding audio time length in the music score information; and
   obtaining the processed audio data by splicing the words obtained after the audio processing.

9. The computing device according to claim 8, wherein the determining a predefined portion of the song according to the song information comprises:

obtaining a start time and a duration that correspond to each word comprised in the lyric file in the song information;

obtaining a start time and a duration that correspond to each musical note comprised in the music score file in the song information, and a pitch of the musical note; and determining the predefined portion of the song according to the start time and the duration that correspond to each word comprised in the lyric file, the start time and the duration that correspond to each musical note comprised in the music score file, and the pitch of the musical note.

10. The computing device according to claim 8, wherein the determining time information of each word in the audio data comprises:

converting the audio data into text data;

determining a lyric word count of the predefined portion and a word count of the text data; and when it is determined that the lyric word count is the same as the word count of the text data, segmenting one or more phonemes in the audio data corresponding to a word in the text data, and determining time information corresponding to the word, the time information comprising start time information and duration information.

11. The computing device according to claim 8, wherein the determining time information corresponding to the word comprises:

converting the audio data into a phoneme sequence, and replacing the phoneme sequence according to a preset acoustic model, to generate a model sequence;

determining a characteristic of each frame in the audio data, and calculating a confidence of the characteristic of the frame in the model sequence, to obtain a confidence calculation result; and determining time information of an initial consonant and a vowel that correspond to a word according to the confidence calculation result.

12. The computing device according to claim 8, wherein the performing audio processing to the word based on its corresponding word time length and a corresponding audio time length in the music score information comprises:

stretching the word time length if the corresponding audio time length in the music score information is greater than the word time length;

keeping the word time length unchanged if the corresponding audio time length in the music score information is equal to the word time length; and compressing the word time length if the corresponding audio time length in the music score information is less than the word time length.

13. The computing device according to claim 8, wherein the operations further comprise:

obtaining mixed audio data by mixing the processed audio data and the accompaniment file.

14. A non-transitory computer readable storage medium storing a plurality of programs in connection with a computing device having one or more processors, wherein the plurality of programs, when executed by the one or more processors, cause the computing device to perform the following operations:

obtaining song information of a song, the song information comprising an accompaniment file, a lyric file, and a music score file that correspond to the song;

determining a predefined portion of the song and music score information corresponding to the predefined portion according to the song information;

receiving audio data that is input by a user;

determining time information of each word in the audio data;

extracting an audio segment corresponding to the word from the audio data based on the time information;

performing audio processing to the word based on its corresponding word time length according to the audio segment and a corresponding audio time length in the music score information; and obtaining the processed audio data by splicing the words obtained after the audio processing.

15. The non-transitory computer readable storage medium according to claim 14, wherein the determining a predefined portion of the song according to the song information comprises:

obtaining a start time and a duration that correspond to each word comprised in the lyric file in the song information;

obtaining a start time and a duration that correspond to each musical note comprised in the music score file in the song information, and a pitch of the musical note; and determining the predefined portion of the song according to the start time and the duration that correspond to each word comprised in the lyric file, the start time and the duration that correspond to each musical note comprised in the music score file, and the pitch of the musical note.

16. The non-transitory computer readable storage medium according to claim 14, wherein the determining time information of each word in the audio data comprises:

converting the audio data into text data;

determining a lyric word count of the predefined portion and a word count of the text data; and when it is determined that the lyric word count is the same as the word count of the text data, segmenting one or more phonemes in the audio data corresponding to a word in the text data, and determining time information corresponding to the word, the time information comprising start time information and duration information.

17. The non-transitory computer readable storage medium according to claim 14, wherein the determining time information corresponding to the word comprises:

converting the audio data into a phoneme sequence, and replacing the phoneme sequence according to a preset acoustic model, to generate a model sequence;

determining a characteristic of each frame in the audio data, and calculating a confidence of the characteristic of the frame in the model sequence, to obtain a confidence calculation result; and determining time information of an initial consonant and a vowel that correspond to a word according to the confidence calculation result.

18. The non-transitory computer readable storage medium according to claim 14, wherein the performing audio processing to the word based on its corresponding word time length and a corresponding audio time length in the music score information comprises:

stretching the word time length if the corresponding audio time length in the music score information is greater than the word time length;

keeping the word time length unchanged if the corresponding audio time length in the music score information is equal to the word time length; and compressing the word time length if the corresponding audio time length in the music score information is less than the word time length.

19. The non-transitory computer readable storage medium according to claim 14, wherein the operations further comprise:
    obtaining mixed audio data by mixing the processed audio data and the accompaniment file.

\* \* \* \* \*